United States Patent [19]

Stephan et al.

[11] Patent Number: 5,965,677
[45] Date of Patent: Oct. 12, 1999

[54] SUPPORTED PHOSPHINIMINE-CP CATALYSTS

[75] Inventors: Douglas W. Stephan, LaSalle; Jeff C. Stewart, Windsor; Daryll G. Harrison, Calgary, all of Canada

[73] Assignee: Nova Chemicals (International) S.A.

[21] Appl. No.: 08/959,589

[22] Filed: Oct. 29, 1997

[30] Foreign Application Priority Data

Jul. 9, 1997 [CA] Canada ................... 2210131

[51] Int. Cl.$^6$ ............... C08F 4/44; B01J 31/00
[52] U.S. Cl. .......... 526/129; 526/160; 526/161; 526/172; 526/901; 526/943; 502/103; 502/117; 502/154; 502/155
[58] Field of Search .................. 502/155, 103, 502/117, 154; 526/161, 172, 129, 160, 901, 943

[56] References Cited

U.S. PATENT DOCUMENTS

| | | | |
|---|---|---|---|
| 4,897,455 | 1/1990 | Welborn, Jr. ............... | 526/129 |
| 5,077,255 | 12/1991 | Welborn, Jr. ............... | 502/104 |
| 5,153,157 | 10/1992 | Hlatky et al. ............... | 502/117 |
| 5,198,401 | 3/1993 | Turner ....................... | 502/155 |
| 5,352,749 | 10/1994 | DeChellis et al. .......... | 526/68 |
| 5,473,028 | 12/1995 | Nowlin et al. .............. | 526/114 |
| 5,534,474 | 7/1996 | Becker et al. .............. | 502/152 |
| 5,557,023 | 9/1996 | Somogyvari et al. ....... | 585/513 |
| 5,625,016 | 4/1997 | Schiffino et al. ........... | 526/160 |

OTHER PUBLICATIONS

Cyclopentadienyl Titanium Complexes with Aryldiasenido or Phosphiniminato–Ligands by J.R. Dilworth, Journal of Organomettalic Chemistry, 159 (1978) 47–52.

Synthese and Reaktionen von ($\eta^5$–Pentamethylcyclopentadienyl)– und ($n^5$ Ethyltetramethylcyclopentadienyl)titantrifluorid by S. Mansheeh et al, Chem. Ber., 1993 136, 913–919.

Neue Komplexe des Titans mit silylierten Aminoiminophosphoran– und Sulfodiimidliganden by R. Hasselburg et al, Leitschrift für Anorganishe und allegemeine Chemis, 619 (1993) 1543–1550.

Poster Presentation by J.C. Stewart and D.W. Stephan, Dept. of Chemistry & Biochemistry, The University of Windsor, at the IDW Conference at McGill University in Nov. 1996.

Phosphaniminato–Komplexe des Titans, Syntheses und Kristallstrukturen von $CpTiCl_2(NPMe_3)$, $[TiCl_3(NPMe_3)]_2$, $Ti_2Cl_5(NPMe_2Ph)_3$ und $[Ti_3Cl_6(NPMe_3)_5][BPh_4]$ by T. Rubenstahl et al, Zeitschrift fur anorganische und allegemeine Chemie, 620(1994) 1741–1749.

Synthesis and Reactivity of Aminobis(dioxyanylamino)phosphanes by G. Shick et al, Chem. Ber., 1996, 129, 911–917.

Stewart et al., Early Transition Metal–Phosphinimine Complexes: Synthesis, Characterization and Catalytic Activity in Olefin Polymerization, text of public presentation given at University of Windsor, Ontario, Canada, pp. 1–9, Nov. 1996.

*Primary Examiner*—David W. Wu
*Assistant Examiner*—Roberto Rabago
*Attorney, Agent, or Firm*—Kenneth H. Johnson

[57] ABSTRACT

A catalyst component which is especially useful in so-called "slurry" or "gas phase" olefin polymerizations and which comprises an organometallic complex of a group 4 metal (having a cyclopentadienyl-type ligand and a phosphinimine ligand) and a particulate support. The catalyst component forms an excellent catalyst system when combined with an activator such as an aluminoxane or a so-called "substantially non-coordinating anion". In a preferred embodiment the organometallic complex and the activator are both deposited on the particulate support.

20 Claims, No Drawings

SUPPORTED PHOSPHINIMINE-CP CATALYSTS

FIELD OF THE INVENTION

This invention relates to a supported phosphinimine-cyclopentadienyl catalyst component which is useful in the polymerization of olefins. The catalyst component is particularly useful in slurry or gas phase polymerization processes.

BACKGROUND OF THE INVENTION

The use of olefin polymerization catalysts based on bis $\eta^5$ cyclopentadienyl complexes of transition metals (metallocenes) and related mono $\eta^5$ cyclopentadienyl complexes (which are also often referred to as metallocenes) in olefin polymerization is now widely known. These complexes may be activated by the aluminum alkyls and/or aluminum alkyl halides which are conventionally used with so-called "Ziegler Natta" polymerization catalysts, although the use of such conventional activators usually does not provide a highly active catalyst.

Professors Kaminsky and Sinn discovered that alumoxanes are excellent activators for zirconocenes in homogeneous polymerizations. However, the catalyst systems reported by Kaminsky and Sinn typically contained a very large excess of the alumoxane (as much as 10,000/1 excess of the aluminum to the transition metal on a molar basis).

It has not been found to be commercially practical to utilize such a large excess of aluminum for supported catalysts. Most notably, it is difficult to effectively support large quantities of the alumoxane. The lower amount of supported aluminoxane used in the supported form of these catalysts has the effect of increasing the aluminum/transition metal ("Al/M") ratios of such catalysts. Simply put, the metal concentration would need to approach impractically low levels to maintain the Al/M ratio, given the limited amount of alumoxane which may be supported. Welborn and Turner disclose several forms of supported Kaminsky/Sinn catalysts which have low Al/M ratios (see, for example, U.S. Pat. No. 4,897,455 and U.S. Pat. No. 5,077,255).

Hlatky and Turner subsequently made the very elegant invention relating to the use of so-called "substantially non-coordinating anions" to activate bis-Cp metallocenes (as disclosed in U.S. Pat. No. 5,153,157 and U.S. Pat. No. 5,198,401).

The present invention relates to a catalyst component which contains an organometallic complex of a group 4 metal having a cyclopentadienyl-type ligand and a phosphinimine ligand ("phosphinimine complex").

Literature references describing similar phosphinimine complexes include:

Cyclopentadienyl Titanium Complexes with aryldiasenido or phosphiniminato-Ligands by J. R. Dilworth, *Journal of Organometallic Chemistry*, 159 (1978) 47–52;

Synthesen und Reaktionen von ($\eta^5$-Pentamethylcyclopentadienyl)-und ($\eta^5$ Ethyltetramethylcyclopentadienyl)titantrifluorid by S. Manshoeh et al, *Chem. Ber.*, 1993 136, 913–919;

Neue Komplexe des Titans mit silylierten Aminoiminophosphoran - und Sulfodiimidliganden by R. Hasselbring et al, *Zeitschrift für anorganische und allgemeine Chemie*, 619 (1993) 1543–1550;

Phosphaniminato-Komplese des Titans, Syntheses und Kristallstrukturen von CpTiCl$_2$(NPMe$_3$), [TiCl$_3$(NPMe$_3$)]$_2$,Ti$_2$Cl$_5$(NPMe$_2$Ph)$_3$ und [Ti$_3$Cl$_6$(NPMe$_3$)$_5$][BPh] by T. Rubenstahl et al, *Zeitschrift für anorganische und allgemeine Chemie*, 620 (1994) 1741–1749; and Syntheses and reactivity of Aminobis(diorganylamino) phosphanes by G. Shick et al, *Chem. Ber.*, 1996,129, 911–917.

While the above art discloses some of the related complexes per se, and in one instance the complex in conjunction with an activator, the art does not disclose the polymerization of olefins, and in particular the polymerization of olefins using a supported form of the complex.

A poster presentation by J. C. Stewart and D. W. Stephan, Department of Chemistry and Biochemistry, The University of Windsor, at the IDW conference at McGill University in November 1996, discloses polymerization of ethylene using certain cyclopentadienyl-phosphinimine catalysts. The turnover in terms of grams of polyethylene/mmol/hr (e.g. productivity or activity) is several orders of magnitude below that obtained with the catalyst components of the present invention. The poster presentation does not disclose the use of the supported catalyst components of the present invention, or polymerization above room temperature, or productivity/activity results which approach commercial utility.

U.S. Pat. No. 5,625,016, issued Apr. 29, 1997, assigned to Exxon Chemical Patents Inc. discloses the polymerization of olefins and in particular the preparation of ethylene propylene rubbers or ethylene propylene diene monomer copolymers, in the presence of a catalyst system prepared from an unbridged group 4 metal, a bulky (substituted) monocyclopentadienyl ligand, a uninegative bulky group 15 ligand and two uninegative activation reactive ligands. The disclosure of the patent teaches the group 15 ligand is an amido ligand. The '016 patent does not teach or suggest the use of a phosphinimine ligand.

SUMMARY OF THE INVENTION

The invention provides a catalyst component for olefin polymerization comprising:

(a) an organometallic complex comprising
 A) one, and only one, metal atom of a group 4 metal selected from Ti, Hf, and Zr;
 B) a cyclopentadienyl-type ligand;
 C) a phosphinimine ligand; and
 D) two univalent ligands; and (b) a particulate support.

DETAILED DESCRIPTION

The organometallic complex of this invention includes a cyclopentadienyl ligand. As used in this specification the term "cyclopentadienyl" refers to a 5-member carbon ring having delocalized bonding within the ring and typically being bound to the group 4 metal (M) through covalent $\eta^5$-bonds.

An unsubstituted cyclopentadienyl ligand has a hydrogen bonded to each carbon in the ring. ("Cyclopentadienyl-type" ligands also include hydrogenated and substituted cyclopentadienyls, as discussed in detail later in the specification.)

In more specific terms, the group 4 metal complexes of the present invention (also referred to herein as "group 4 metal complex" or "group 4 OMC") comprise a complex of the formula:

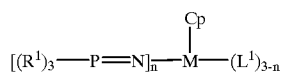

wherein
A) M is selected from the group consisting of Ti, Zr, and Hf; n is 1 or 2;
B) Cp is a cyclopentadienyl-type ligand which is unsubstituted or substituted by up to five substituents independently selected from the group consisting of $C_{1-10}$ hydrocarbyl radicals with the proviso that two hydrocarbyl radicals taken together may form a ring, wherein said substituents or ring are unsubstituted or further substituted by substituents selected from the group consisting of:
 a) a halogen atom,
 b) a $C_{1-8}$ alkyl radical,
 c) a $C_{1-8}$ alkoxy radical,
 d) a $C_{6-10}$ aryl or aryloxy radical,
 e) an amido radical which is unsubstituted or substituted by up to two $C_{1-8}$ alkyl radicals,
 f) a phosphido radical which is unsubstituted or substituted by up to two $C_{1-8}$ alkyl radicals,
 g) a silyl radical of the formula —Si—$(R^2)_3$ wherein each $R^2$ is independently selected from the group consisting of hydrogen, a $C_{1-8}$ alkyl or alkoxy radical, $C_{6-10}$ aryl or aryloxy radicals,
 h) a germanyl radical of the formula Ge—$(R^{21})_3$ wherein each $R^{21}$ is independently selected from the group consisting of hydrogen, a $C_{1-8}$ alkyl or alkoxy radical, $C_{6-10}$ aryl or aryloxy radicals;
C) each $R^1$ is independently selected from the group consisting of:
 i) a hydrogen atom,
 j) a halogen atom,
 k) $C_{1-10}$ hydrocarbyl radicals which are unsubstituted by or further substituted by a halogen atom, a $C_{1-8}$ alkyl radical, $C_{1-8}$ alkoxy radical, a $C_{6-10}$ aryl or aryloxy radical,
 l) a silyl radical of the formula —Si—$(R^{22})_3$ wherein each $R^{22}$ is independently selected from the group consisting of hydrogen, a $C_{1-8}$ alkyl or alkoxy radical, $C_{6-10}$ aryl or aryloxy radicals,
 m) a germanyl radical of the formula Ge—$(R^{23})_3$ wherein each $R^{23}$ is independently selected from the group consisting of hydrogen, a $C_{1-8}$ alkyl or alkoxy radical, $C_{6-10}$ aryl or aryloxy radicals,
with the proviso that two $R^1$ radicals taken together may form a bidentate hydrocarbyl radical having up to 10 carbon atoms, wherein said bidentate hydrocarbyl radical is unsubstituted by or further substituted by substituents selected from the group consisting of:
 n) a halogen atom,
 o) a $C_{1-8}$ alkyl radical,
 p) a $C_{1-8}$ alkoxy radical,
 q) a $C_{6-10}$ aryl or aryloxy radical,
 r) a silyl radical of the formula —Si—$(R^{24})_3$ wherein each $R^{24}$ is independently selected from the group consisting of hydrogen, a $C_{1-8}$ alkyl or alkoxy radical, $C_{6-10}$ aryl or aryloxy radicals,
 s) a germanyl radical of the formula Ge—$(R^{25})_3$ wherein each $R^{25}$ is independently selected from the group consisting of hydrogen, a $C_{1-8}$ alkyl or alkoxy radical, $C_{6-10}$ aryl or aryloxy radicals;
provided that $R^1$ individually or two $R^1$ radicals taken together may not form a Cp ligand as defined above; and
D) each $L^1$ is independently selected from the group consisting of:
 t) a hydrogen atom,
 u) a halogen atom,
 v) a $C_{1-10}$ hydrocarbyl radical,
 w) a $C_{1-10}$ alkoxy radical,
 x) a $C_{6-10}$ aryl oxide radical,
each of which said hydrocarbyl, alkoxy, and aryl oxide radicals may be unsubstituted by or further substituted by substituents selected from the group consisting of:
 y) a halogen atom,
 z) a $C_{1-8}$ alkyl radical,
 aa) a $C_{1-8}$ alkoxy radical,
 bb) a $C_{6-10}$ aryl or aryloxy radical,
 cc) an amido radical which is unsubstituted or substituted by up to two $C_{1-8}$ alkyl radicals,
 dd) a phosphido radical which is unsubstituted or substituted by up to two $C_{1-8}$ alkyl radicals,
with the proviso that $L^1$ may not be a Cp radical as defined above.

Referring to the above formula, the [$(R^1)_3$—P=N] fragment is the phosphinimine ligand. The ligand is characterized by (a) having a nitrogen phosphorous double bond; (b) having only one substituent on the N atom (i.e. the P atom is the only substituent on the N atom); and (c) the presence of three substituents on the P atom. It is preferred that each of the three $R^1$ substituents is tertiary butyl (or "t-butyl"), i.e. the preferred phosphinimine is tri(tertiary butyl) phosphinimine.

For reasons of cost, the Cp ligand in the group 4 metal complex is preferably unsubstituted. However, if Cp is substituted, then preferred substituents include a fluorine atom, a chlorine atom, $C_{1-6}$ hydrocarbyl radical, or two hydrocarbyl radicals taken together may form a bridging ring, an amido radical which is unsubstituted or substituted by up to two $C_{1-4}$ alkyl radicals, a phosphido radical which is unsubstituted or substituted by up to two $C_{1-4}$ alkyl radicals, a silyl radical of the formula —Si—$(R^2)_3$ wherein each $R^2$ is independently selected from the group consisting of a hydrogen atom and a $C_{1-4}$ alkyl radical; a germanyl radical of the formula —Ge—$(R^2)_3$ wherein each $R^2$ is independently selected from the group consisting of a hydrogen atom and a $C_{1-4}$ alkyl radical.

In the group 4 metal complex preferably each $R^1$ is selected from the group consisting of a hydrogen atom, a halide, preferably fluorine or chlorine atom, a $C_{1-4}$ alkyl radical, a $C_{1-4}$ alkoxy radical, a silyl radical of the formula —Si—$(R^2)_3$ wherein each $R^2$ is independently selected from the group consisting of a hydrogen atom and a $C_{1-4}$ alkyl radical; and a germanyl radical of the formula —Ge—$(R^2)_3$ wherein each $R^2$ is independently selected from the group consisting of a hydrogen atom and a $C_{1-4}$ alkyl radical. It is particularly preferred that each $R^1$ be a tertiary butyl radical.

Each $L^1$ is a univalent ligand. The primary performance criterion for each $L^1$ is that it doesn't interfere with the activity of the catalyst system. As a general guideline, any of the non-interfering univalent ligands which may be employed in analogous metallocene compounds (e.g. halides, especially chlorine, alkyls, alkoxy groups, amido groups, phosphido groups, etc.) may be used in this invention.

In the group 4 metal complex preferably each $L^1$ is independently selected from the group consisting of a hydrogen atom, a halogen, preferably fluorine or chlorine atom, a $C_{1-6}$ alkyl radical, a $C_{1-6}$ alkoxy radical, and a $C_{6-10}$ aryl oxide radical.

The supported catalyst components of this invention are particularly suitable for use in a slurry polymerization process or a gas phase polymerization process.

A typical slurry polymerization process uses total reactor pressures of up to about 50 bars and reactor temperatures of up to about 200° C. The process employs a liquid medium (e.g. an aromatic such as toluene or an alkane such as hexane, propane or isobutane) in which the polymerization takes place. This results in a suspension of solid polymer particles in the medium. Loop reactors are widely used in slurry processes. Detailed descriptions of slurry polymerization processes are widely reported in the open and patent literature.

The gas phase process is preferably undertaken in a fluidized bed reactor. Such fluidized bed reactors are widely described in the literature. A concise description of the process follows.

In general, a fluidized bed gas phase polymerization reactor employs a "bed" of polymer and catalyst which is fluidized by a flow of monomer which is at least partially gaseous. Heat is generated by the enthalpy of polymerization of the monomer flowing through the bed. Unreacted monomer exits the fluidized bed and is contacted with a cooling system to remove this heat. The cooled monomer is then recirculated through the polymerization zone, together with "make-up" monomer to replace that which was polymerized on the previous pass. As will be appreciated by those skilled in the art, the "fluidized" nature of the polymerization bed helps to evenly distribute/mix the heat of reaction and thereby minimize the formation of localized temperature gradients (or "hot spots"). Nonetheless, it is essential that the heat of reaction be properly removed so as to avoid softening or melting of the polymer (and the resultant—and highly undesirable—"reactor chunks"). The obvious way to maintain good mixing and cooling is to have a very high monomer flow through the bed. However, extremely high monomer flow causes undesirable polymer entrainment.

An alternative (and preferable) approach to high monomer flow is the use of an inert condensable fluid which will boil in the fluidized bed (when exposed to the enthalpy of polymerization), then exit the fluidized bed as a gas, then come into contact with a cooling element which condenses the inert fluid. The condensed, cooled fluid is then returned to the polymerization zone and the boiling/condensing cycle is repeated.

The above-described use of a condensable fluid additive in a gas phase polymerization is often referred to by those skilled in the art as "condensed mode operation" and is described in additional detail in U.S. Pat. No. 4,543,399 and U.S. Pat. No. 5,352,749. As noted in the '399 reference, it is permissible to use alkanes such as butane, pentanes or hexanes as the condensable fluid and the amount of such condensed fluid should not exceed about 20 weight per cent of the gas phase.

Other reaction conditions for the polymerization of ethylene which are reported in the '399 reference are:

Preferred Polymerization Temperatures: about 75° C. to about 115° C. (with the lower temperatures being preferred for lower melting copolymers—especially those having densities of less than 0.915 g/cc—and the higher temperatures being preferred for higher density copolymers and homopolymers); and Pressure: up to about 1000 psi (with a preferred range of from about 100 to 350 psi for olefin polymerization).

The '399 reference teaches that the fluidized bed process is well adapted for the preparation of polyethylene but further notes that other monomers may also be employed. The present invention is similar with respect to choice of monomers.

Preferred monomers include ethylene and $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene, and 1-decene, styrene, alpha methyl styrene, p-t-butyl styrene, and the constrained-ring cyclic olefins such as cyclobutene, cyclopentene, dicyclopentadiene norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

The polyethylene polymers which may be prepared in accordance with the present invention typically comprise not less than 60, preferably not less than 70 weight % of ethylene and the balance one or more $C_{4-10}$ alpha olefins, preferably selected from the group consisting of 1-butene, 1-hexene and 1-octene. The polyethylene prepared in accordance with the present invention may be linear low density polyethylene having a density from about 0.910 to 0.935 g/cc or high density polyethylene having a density above 0.935 g/cc. The present invention might also be useful to prepare polyethylene having a density below 0.910 g/cc—the so-called very low and ultra low density polyethylenes.

The present invention may also be used to prepare co- and terpolymers of ethylene, propylene and optionally one or more diene monomers. Generally, such polymers will contain about 50 to about 75 weight % ethylene, preferably about 50 to 60 weight % ethylene and correspondingly from 50 to 25 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene. Particularly preferred dienes are 5-ethylidene-2-norbornene and 1,4-hexadiene.

The present invention unequivocally requires the use of a support. An exemplary list of support materials include metal oxides (such as silica, alumina, silica-alumina, titania and zirconia); metal chlorides (such as magnesium chloride); talc, polymers (including polyolefins); partially prepolymerized mixtures of a group 4 metal complex, activator and polymer; spray dried mixtures of the group 4 metal complex, activator and fine "inert" particles (as disclosed, for example, in European Patent Office Application 668,295 (to Union Carbide)).

The preferred support material is silica. In a particularly preferred embodiment, the silica has been treated with an alumoxane (especially methylalumoxane or "MAO") prior to the deposition of the group 4 metal complex. The procedure for preparing "supported MAO" which is described in U.S. Pat. No. 5,534,474 (to Witco) is preferred for reasons of economy. It will be recognized by those skilled in the art that silica may be characterized by such parameters as particle size, pore volume and residual silanol concentration. The pore size and silanol concentration may be altered by heat treatment or calcining. The residual silanol groups provide a potential reaction site between the alumoxane and the silica (and, indeed, some off gassing is observed when alumoxane is reacted with silica having residual silanol groups). This reaction may help to "anchor" the alumoxane to the silica (which, in turn, may help to reduce reactor fouling).

The preferred particle size, preferred pore volume and preferred residual silanol concentration may be influenced by reactor conditions. Typical silicas are dry powders having a particle size of from 1 to 200 microns (with an average particle size of from 30 to 100 being especially suitable); pore size of from 50 to 500 Angstroms; and pore volumes of from 0.5 to 5.0 cubic centimeters per gram. As a general guideline, the use of commercially available silicas, such as those sold by W. R. Grace under the trademarks Davison 948 or Davison 955, are suitable.

The activator may be selected from the group consisting of:

(i) an aluminoxane; and (ii) a combination of an alkylating activator and an activator capable of ionizing the group 4 metal complex.

The aluminoxane activator may be of the formula $(R^4)_2AlO(R^4AlO)_mAl(R^4)_2$ wherein each $R^4$ is independently selected from the group consisting of $C_{1-20}$ hydrocarbyl radicals and m is from 0 to 50, preferably $R^4$ is a $C_{1-4}$ alkyl radical and m is from 5 to 30. The aluminoxane activator may be used prior to the reaction but preferably in situ alkylation is typical (e.g. alkyl groups replacing $L^1$, hydrogen, or halide groups).

The activator of the present invention may be a combination of an alkylating agent (which may also serve as a scavenger) in combination with an activator capable of ionizing the group 4 metal complex.

The alkylating agent may be selected from the group consisting of $(R^3)_pMgX_{2-p}$ wherein X is a halide and each $R^3$ is independently selected from the group consisting of $C_{1-10}$ alkyl radicals and p is 1 or 2; $R^3Li$ wherein in $R^3$ is as defined above, $(R^3)_qZnX_{2-q}$ wherein $R^3$ is as defined above, X is halogen and q is 1 or 2; $(R^3)_sAlX_{3-s}$ wherein $R^3$ is as defined above, X is halogen and s is an integer from 1 to 3. Preferably in the above compounds $R^3$ is a $C_{1-4}$ alkyl radical, and X is chlorine. Commercially available compounds include triethyl aluminum (TEAL), diethyl aluminum chloride (DEAC), dibutyl magnesium ($(Bu)_2Mg$), and butyl ethyl magnesium (BuEtMg or BuMgEt).

The activator capable of ionizing the group 4 metal complex may be selected from the group consisting of:

(i) compounds of the formula $[R^5]^+[B(R^7)_4]^-$ wherein B is a boron atom, $R^5$ is a cyclic $C_{5-7}$ aromatic cation or a triphenyl methyl cation and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^9)_3$; wherein each $R^9$ is independently selected from the group consisting of a hydrogen atom and a $C_{1-4}$ alkyl radical; and (ii) compounds of the formula $[(R^8)_tZH]^+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and (iii) compounds of the formula $B(R^7)_3$ wherein $R^7$ is as defined above.

In the above compounds preferably $R^7$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilium radical which is substituted by two $C_{1-4}$ alkyl radicals.

While not wanting to be bound by theory, it is generally believed that the activator capable of ionizing the group 4 metal complex abstract one or more $L^1$ ligands so as to ionize the group 4 metal center into a cation (but not to covalently bond with the group 4 metal) and to provide sufficient distance between the ionized group 4 metal and the ionizing activator to permit a polymerizable olefin to enter the resulting active site. In short the activator capable of ionizing the group 4 metal complex maintains the group 4 metal in a +1 valence state, while being sufficiently liable to permit its displacement by an olefin monomer during polymerization. In the catalytically active form, these activators are often referred to by those skilled in the art as substantially non-coordinating anions ("SNCA").

Examples of compounds capable of ionizing the group 4 metal complex include the following compounds:

triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra (o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra (o-tolyl)boron N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron di-(isopropyl)ammonium tetra(pentafluorophenyl)boron, dicyclohexylammonium tetra (phenyl)boron triphenylphosphonium tetra)phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyltris-pentafluorophenyl borate, triphenylmethylium phenyl-trispentafluorophenyl borate, benzene (diazonium) phenyltrispentafluorophenyl borate, tropillium tetrakis (2,3,5,6-tetrafluorophenyl) borate, triphenylmethylium tetrakis (2,3,5,6-tetrafluorophenyl) borate, benzene (diazonium) tetrakis (3,4,5-trifluorophenyl) borate, tropillium tetrakis (3,4,5-trifluorophenyl) borate, benzene (diazonium) tetrakis (3,4,5-trifluorophenyl) borate, tropillium tetrakis (1,2,2-trifluoroethenyl) borate, trophenylmethylium tetrakis (1,2,2-trifluoroethenyl ) borate, benzene (diazonium) tetrakis (1,2,2-trifluoroethenyl) borate, tropillium tetrakis (2,3,4,5-tetrafluorophenyl) borate, triphenylmethylium tetrakis (2,3,4,5-tetrafluorophenyl) borate, and benzene (diazonium) tetrakis (2,3,4,5-tetrafluorophenyl) borate.

Readily commercially available activators which are capable of ionizing the group 4 metal complexes include:

N,N-dimethylaniliumtetrakispentafluorophenyl borate ("[Me$_2$NHPh][B(C$_6$F$_5$)$_4$]");

triphenylmethylium tetrakispentafluorophenyl borate ("[Ph$_3$C][B(C$_6$F$_5$)$_4$]"); and trispentafluorophenyl boron.

If the group 4 metal complex is activated with a combination of an alkylating agent (other than aluminoxane) and a compound capable of ionizing the group 4 metal complex, then the molar ratios of group 4 metal:metal in the alkylating agent; metalloid (i.e. boron or phosphorus) in the activator capable of ionizing the group 4 metal complex (e.g. boron) may range from 1:1:1 to 1:10:5. Preferably, the alkylating activator is premixed/reacted with the group 4 metal complex and the resulting alkylated species is then reacted with the activator capable of ionizing the group 4 metal complex.

The term "catalyst component" as used herein refers to a combination of: (1) the aforedefined group 4 organometallic complex having a cyclopentadienyl-type ligand and a phosphine ligand ("group 4 OMC"); and (2) a particulate support material (in a form in which the group 4 OMC is "supported"). This catalyst component is used in conjunction with an activator such as the aforedescribed aluminoxanes and/or SNCA to form an active catalyst system.

The activator may be added to the polymerization reactor separately from the catalyst component or, alternatively, the activator may be co-supported with the group 4 OMC.

It is preferred to use an activator which is co-supported with the group 4 OMC. The co-supported group 4 OMC and activator system may be prepared using one of three general techniques:

Technique 1: First deposit the group 4 OMC on the support (then support the activator);

Technique 2: First deposit the activator on the support (then support the group 4 OMC); or Technique 3: Support a mixture (solution or slurry) of the group 4 OMC and the activator at the same time.

The second technique (i.e. first support the activator; then support the group 4 OMC) is generally preferred if the objective is to achieve maximum catalyst activity on a group 4 OMC basis. (This may be necessary if the group 4 OMC which is being used has comparatively low activity.) Especially high activity may be obtained through the use of gel-free aluminoxanes having specific particle sizes (as described in PCT patent applications 95/18809 and 95/18836).

However, as will be recognized by those skilled in the art, there is often some correlation between very high catalyst activity and undesirable reactor fouling. Moreover (though not wishing to be bound by any particular theory), it has been postulated that some reactor fouling is caused by productivity gradients within supported catalysts (or localized catalyst "hot spots" of high activity) and that these "hot spots" are in turn caused by an uneven distribution of the catalytic metal on the support.

Accordingly, if the primary objective is to prepare a catalyst system which causes minimal reactor fouling, then it is preferred to use low group 4 OMC concentrations and/or initially pre-mix the activator and group 4 OMC in a solvent or diluent then deposit this mixture/solution on the support. The use of "incipient wetness" techniques to deposit a mixture of activator and group 4 OMC is described in U.S. Pat. No. 5,473,028 (to Mobil) as a means to produce catalyst systems having "low fouling" characteristics.

We prefer to use low group 4 OMC concentrations (particularly when using a highly active group 4 OMC, such as the (t-butyl)$_3$ phosphinimine system described in the examples). When an alumoxane is used as the activator, the low group 4 OMC concentration results in a relatively high Al/transition metal ratio (for a supported catalyst). It is especially preferred when preparing "low fouling" catalysts to use an Al/transition metal ratio of from 75/1 to 200/1, especially from 100/1 to 200/1, and preferably from 110/1 to 150/1. These ratios are produced by using small quantities of the group 4 OMC. However, the very low concentration of group 4 OMC in these catalysts may cause "shelf life" problems for the catalyst (i.e. catalyst systems having low concentrations of transition metal can be more susceptible to activity deterioration from exposure to oxygen, light, or the like than catalyst systems having a high level of transition metal). The use of a thin coating of mineral oil is desirable to mitigate this problem. Thus, highly preferred catalyst samples of this invention use co-supported group 4 OMC and activator; the support is particulate silica; the activator is methaluminoxane; the group 4 OMC is highly active but used in low concentration (so as to provide an Al/transition metal ratio of from 100/1 to 200/1) and the catalyst system (consisting of co-supported group 4 OMC and alumoxane on particulate silica) is coated with a thin layer of mineral oil.

The use of SNCA as an activator also may be used in combination with a catalyst component according to this invention. Silica is also the preferred support when using SNCA. It is recommended to initially treat the silica with a minor amount of an aluminum alkyl prior to depositing the SNCA. The amount of aluminum alkyl should be less than the amount of residual silanol groups on a molar basis.

Further details are illustrated in the following non-limiting examples.

EXAMPLES

Polymer Analysis

Gel permeation chromatography ("GPC") analysis was carried out using a commercially available chromatograph (sold under the name Waters 150 GPC) using 1,2,4-trichlorobenzene as the mobile phase at 140° C. The samples were prepared by dissolving the polymer in the mobile phase solvent in an external oven at 0.1% (weight/volume) and were run without filtration. Molecular weights are expressed as polyethylene equivalents with a relative standard deviation of 2.9% and 5.0% for the number average molecular weight Mn and weight average molecular weight Mw, respectively. Melt index (MI) measurements were conducted according to ASTM method D-1238-82.

Polymer densities were measured using pressed plaques (ASTM D-1928-90) with a densitometer. The polymer composition was determined using FTIR where the 1-butene or 1-hexene content was measured.

Catalyst Preparation and Polymerization Testing Using a Semi-Batch, Gas Phase Reactor The catalyst preparation methods described below employ typical techniques for the synthesis and handling of air-sensitive materials. Standard Schlenk and drybox techniques were used in the preparation of ligands, metal complexes, support substrates and supported catalyst systems. Solvents were purchased as anhydrous materials and further treated to remove oxygen and polar impurities by contact with a combination of activated alumina, molecular sieves and copper oxide on silica/alumina. Where appropriate, elemental compositions of the supported catalysts were measured by Neutron Activation analysis with a reported accuracy of ±1% (weight basis). All supported catalyst components according to the invention were coated with a thin layer of mineral oil subsequent to the deposition of the group 4 OMC. This was done by preparing a slurry of the supported catalyst component in mineral oil.

All the polymerization experiments described below were conducted using a semi-batch, gas phase polymerization reactor of total internal volume of 2.2 L. Reaction gas mixtures, including separately ethylene or ethylene/butene mixtures were measured to the reactor on a continuous basis using a calibrated thermal mass flow meter, following passage through purification media as described above. A pre-determined mass of the catalyst sample was added to the reactor under the flow of the inlet gas with no pre-contact of the catalyst with any reagent, such as a catalyst activator. The catalyst was activated in-situ (in the polymerization reactor) at the reaction temperature in the presence of the monomers, using a metal alkyl complex which has been previously added to the reactor to remove adventitious impurities. Purified and rigorously anhydrous sodium chloride was used as a catalyst dispersing agent.

The internal reactor temperature is monitored by a thermocouple in the polymerization medium and can be controlled at the required set point to +/−1.0° C. The duration of the polymerization experiment was one hour. Following the completion of the polymerization experiment, the polymer was separated from the sodium chloride and the yield determined.

Example 1

Preparation and Ethylene/1-Butene Copolymerization of MAO/Silica Supported Cyclopentadienyl titanium [(tri(t-butyl) phosphinimine)]-(2,6-di(isopropyl)phenoxy) chloride Catalyst Synthesis Commercial "polymethylaluminoxane" or "methalumoxane" (MAO) on granular silica (1.65 g, Witco TA 02794/HU04, 23 wt. % Al) was suspended in anhydrous toluene (40 mL). A solution of cyclopentadienyl titanium[(tri(t-butyl) phosphinimine)](2,6-di(isopropyl)phenoxy)chloride (0.098 g, 0.18 mmol) in anhydrous toluene was prepared and the total volume was added dropwise to a stirred suspension of the MAO on silica. The slurry was allowed to stir overnight and subsequently heated at 45° C. for a period of 2.0 hours. The resulting solid was collected via filtration and washed first with toluene (2×15 mL) and then hexane (2×20 mL). After drying in vacuo, 1.55 grams of a free-flowing yellow powder was obtained. Compositional analysis of the supported catalyst by Neutron Activation showed the catalyst to contain aluminum and titanium in a ratio of 97:1 (mol basis).

Polymerization

Gas phase ethylene homopolymerization of the supported catalyst was conducted by introducing the supported catalyst (25 mg) into a continuously stirred, 2 L pressure vessel under operating conditions of 200 psig 1-butene in ethylene (Airgas, polymerization grade, 3.9 mol %) and at a constant temperature of 90° C. for a period of 1 hr. A seed bed of NaCl (70 g, oven dried at 175° C. for 48 hours), treated in situ with a heptane solution of tri-isobutylaluminum (TIBAl, 1 mL of a 25 wt. % solution, Akzo Nobel), was added to the reactor prior to introduction of the catalyst as a poison scavenger. Upon termination of the reaction and isolation of the polymer, a free-flowing product was obtained in a yield of 25 g, representing a catalyst activity of 125,000 g PE/g Ti. The polymer, characterized by GPC, showed a molecular weight of 362,000 (Mw) and a polydispersity of 3.4 (where polydispersity=Mw/Mn). The polymer was found to contain 3.0 mol % of 1-butene.

Example 2

Preparation and Ethylene/1-Butene Copolymerization of MAO/Silica Supported Cyclopentadienyl titanium [(tri(t-butyl) phosphinimine)](2,6-di(isopropyl)phenoxy) chloride Polymerization Using the same catalyst as described in Example 1, and identical polymerization conditions as described in Example 1 with the exception that the duration of the polymerization experiment was two hours and 13 mg of the supported catalyst was used, a free-flowing product was obtained in a yield of 40 g, representing a catalyst activity of 398,000 g PE/g Ti. The polymer, characterized by gel permeation chromatography (GPC), showed a molecular weight of 452,000 (Mw) and a polydispersity of 2.3. The polymer was found to contain 2.9 mol % of 1-butene.

Example 3

Preparation and Ethylene/1-Butene Copolymerization of MAO/Silica Supported Cyclopentadienyl titanium [(tri(t-butyl) phosphinimine)]dichloride Catalyst Synthesis The same procedure as described in Example 1 was used, except that cyclopentadienyl titanium (tri(t-butyl) phosphinimine dichloride (0.065 g, 0.18 mmol) was used in place of cyclopentadienyl titanium [(tri(t-butyl) phosphinimine)](2,6-di(isopropyl)phenoxy)chloride and that 1.47 g of a free-flowing brown powder was obtained. Compositional analysis of the supported catalyst by Neutron Activation showed the catalyst to contain aluminum and titanium in a ratio of 90:1 (mol basis).

Polymerization

Using the same procedure as described in Example 1 except that 50 mg of the supported catalyst was used, 49 g of polyethylene was obtained, representing a catalyst productivity of 113,000 g/g Ti. The polymer, characterized by GPC, showed a molecular weight of 533,000 (Mw) and a polydispersity of 4.5. The polymer was found to contain 2.8 mol % of 1-butene.

Example 4

Preparation and Ethylene/1-Butene Copolymerization of MAO/Silica Supported Cyclopentadienyl titanium [(tri(t-butyl) phosphinimine)]dichloride Using the same catalyst as described in Example 3, and identical polymerization conditions as described in Example 3 with the exception that the duration of the polymerization experiment was two hours, 149 g of polyethylene was obtained, representing a catalyst productivity of 344,000 g/g Ti. The polymer, characterized by GPC, showed a molecular weight of 512,000 (Mw) and a polydispersity of 2.3. The polymer was found to contain 3.1 mol % of 1-butene.

Example 5

Preparation and Ethylene/1-Butene Copolymerization of MAO/Silica Supported Cyclopentadienyl titanium [(tri(t-butyl) phosphinimine)]dichloride Catalyst Synthesis The same procedure as described in Example 3 was used, except that a lesser quantity of the cyclopentadienyl titanium (tri(t-butyl)phosphinimine)dichloride (0.032 g, 0.089 mmol) was used in combination with the Witco MAO on $SiO_2$ (1.07 g) to give a catalyst having aluminum to titanium in a ratio of 113:1 (mol basis).

Polymerization

Using the same procedure as described in Example 1 except that 26 mg of the supported catalyst was used, 38 g of polyethylene was obtained, representing a catalyst productivity of 201,000 g/g Ti. The polymer, characterized by GPC, showed a molecular weight of 546,000 (Mw) and a polydispersity of 3.7. The polymer was found to contain 3.1 mol % of 1-butene.

Example 6

Preparation and Ethylene/1-Butene Copolymerization of MAO/Silica Supported Cyclopentadienyl titanium [(tri(t-butyl) phosphinimine)]dichloride Catalyst Synthesis The same procedure as described in Example 3 was used, except that a greater quantity of the cyclopentadienyl titanium(tri(t-butyl)phosphinimine)dichloride (0.076 g, 0.211 mmol) was used in combination with the Witco MAO on $SiO_2$ (1.07 g) to give a catalyst having aluminum to titanium in a ratio of 47:1 (mol basis).

Polymerization

Using the same procedure as described in Example 1 except that 13 mg of the supported catalyst was used, 25 g of polyethylene was obtained, representing a catalyst productivity of 109,000 g/g Ti. The polymer, characterized by GPC, showed a molecular weight of 588,000 (Mw) and a polydispersity of 4.2. The polymer was found to contain 2.9 mol % of 1-butene.

Example 7

Preparation and Ethylene/1-Butene Copolymerization of Modified MAO/Silica Supported Cyclopentadienyl titanium [(tri(t-butyl) phosphinimine)]dichloride Catalyst Synthesis The supported MAO was prepared according to the following instructions.

To a sample of partially de-hydroxylated silica (5.01 g, Grace Davison 948) was added, via dropwise addition, a solution of MAO in toluene (100.95 g, 10 wt. %, Akzo Nobel) with stirring. The resulting slurry was allowed to stir slowly overnight at room temperature, after which the toluene was removed in vacuo and the solid dried overnight in vacuo. Subsequently the solid was heated at 170° C. in vacuo for three hours, then slurried in toluene (150 mL) and further heated for one hour at 90° C. The white solid was filtered, washed with hot toluene (2×30 mL) and hexane (2×20 mL). The solid was then dried in vacuo for one hour at 120° C. after which 11.7 g of a white, free-flowing powder was recovered.

The modified MAO on silica (0.898 g) was suspended in anhydrous hexane (40 mL) and allowed to stir for 30 minutes. A slurry of cyclopentadienyl titanium[(tri(t-butyl) phosphinimine)]dichloride (0.018 g, 0.051 mmol) in anhydrous hexane was prepared and the total volume was added dropwise to the stirred suspension of the MAO on silica. The slurry was allowed to stir for 30 minutes, then filtered, wash with hexane (2×20 mL) and dried in vacuo. The catalyst was isolated as a white powder in a yield of 0.80 g.

Polymerization

Using the same procedure as described in Example 1 except that 25 mg of the supported catalyst was used, 36 g of polyethylene was obtained, representing a catalyst productivity of 145,000 g/g Ti. The polymer, characterized by GPC, showed a molecular weight of 472,000 (Mw) and a polydispersity of 3.3. The polymer was found to contain 2.9 mol % of 1-butene.

Example 8

Preparation and Ethylene/1-Butene Copolymerization of MAO/Silica Supported Cyclopentadienyl titanium [(tri(t-butyl) phosphinimine)]dimethyl Catalyst Preparation A sample of cyclopentadienyl titanium[tri(t-butyl) phosphinimine)]dichloride (0.186 g, 0.52 mmoL) was dissolved in anhydrous diethylether (40 mL) and reduced in temperature to −78° C. To this was slowly added a 15 mL solution containing 1.4 mmoL of MeMgBr and the resulting solution allowed to warm to room temperature. Removal of the solvent in vacuo, followed by washing with hexane yielded a green solid. This was dissolved in toluene, filtered and precipitated using hexane to give a pale yellow/green solid. The existence of the dimethyl adduct was confirmed by $^1H$ NMR.

Commercial polymethylaluminoxane (MAO) on granular silica (0.62 g, Witco TA 02794/HL/04, 23 wt. % Al) was suspended in anhydrous hexane (40 mL) and to this was added a toluene solution of cyclopentadienyl titanium[tri(t-butyl)phosphinimine)]dimethyl (0.062 mmoL, 0.019 g in 3.6 mL) and the resulting suspension was allowed to stir for 30 minutes. The solid was filtered, washed with hexane and dried in vacuo to give 0.49 g of a free flowing yellow powder. Compositional analysis of the supported catalyst by Neutron Activation showed the catalyst to contain aluminum and titanium in a ratio of 93 (mol basis).

Polymerization

Using the same procedure as described in Example 1 except that 13 mg of the supported catalyst was used, 20 g of polyethylene was obtained, representing a catalyst productivity of 178,000 g/g Ti. The polymer, characterized by GPC, showed a molecular weight of 557,000 (Mw) and a polydispersity of 3.1. The polymer was found to contain 3.8 mol % of 1-butene.

Example 9

Preparation and Ethylene/1-Butene Copolymerization of Modified MAO/Silica Supported Cyclopentadienyl titanium [(tri(t-butyl) phosphinimine)]dimethyl Catalyst Preparation A sample of cyclopentadienyl titanium[tri(t-butyl) phosphinimine)]dichloride (0.186 g, 0.52 mmoL) was dissolved in anhydrous diethylether (40 mL) and reduced in temperature to −78° C. To this was slowly added a 15 mL solution containing 1.4 mmoL of MeMgBr and the resulting solution allowed to warm to room temperature. Removal of the solvent in vacuo, followed by washing with hexane yielded a green solid. This was dissolved in toluene, filtered and precipitated using hexane to give a pale yellow/green solid. The existence of the dimethyl adduct was confirmed by $^1$H NMR.

A sample of the MAO on silica (0.56 g) as described in Example 3 was suspended in 30 mL of hexane and to this was added a toluene solution of cyclopentadienyl titanium [tri(t-butyl)phosphinimine)]dimethyl (0.056 mmoL, 0.017 g in 3.3 mL) and the resulting suspension was allowed to stir for 30 minutes. The solid was filtered, washed with hexane and dried in vacuo to give 0.46 g of a free flowing yellow powder.

Polymerization

Using the same procedure as described in Example 1 except that 13 mg of the supported catalyst was used, 24 g of polyethylene was obtained, representing a catalyst productivity of 209,000 g/g Ti. The polymer, characterized by GPC, showed a molecular weight of 622,000 (Mw) and a polydispersity of 2.3. The polymer was found to contain 2.5 mol % of 1-butene.

Example 10

Preparation and Ethylene/1-Butene Copolymerization of Cyclopentadienyl titanium[tri (t-butyl)phosphinimine)]dimethyl and [Ph$_3$C][B (C$_6$F$_5$)$_4$] Supported on Triethylaluminum-treated Silica Catalyst Preparation A sample of silica (10 g, Davison 948) was calcined by heating to a temperature of 600° C. under a steady stream of nitrogen gas for a period of 8 hours. After cooling to room temperature the sample was slurried in dry n-hexane (100 mL), cooled to 0C and a solution of triethyl aluminum in n-hexane (50 mL of a 25 wt. % solution, Akzo Nobel) was added slowly via a dropping funnel. The resulting suspension was allowed to warm slowly to room temperature with intermittent stirring and the solid isolated by filtering. A white powder was obtained after repeated washings with n-hexane and drying in vacuo.

To a solution of cyclopentadienyl titanium[tri(t-butyl) phosphinimine)]dimethyl in toluene (0.110 mmoL, prepared as described in Example 5) was added a toluene solution of [Ph$_3$C][B(C$_6$F$_5$)$_4$] (0.111 mmoL). The dark yellow solution was allowed to stir for fifteen minutes and then added slowly to a toluene suspension of the triethylaluminum ("TEAL") treated silica (1.07 g in 30 mL). The suspension was allowed to stir for 30 minutes and the toluene removed in vacuo at a temperature of 40° C. Addition of dry hexane gave a suspension which was filtered and, after repeated washing with hexane and subsequent drying in vacuo, gave 0.62 g of a bright yellow solid.

Polymerization

Using the same procedure as described in Example 1 except that 13 mg of the supported catalyst was used, 25 g of polyethylene was obtained, representing a catalyst productivity of 68,000 g/g Ti. The polymer, characterized by GPC, showed a molecular weight of 519,000 (Mw) and a polydispersity of 3.5. The polymer was found to contain 1.8 mol % of 1-butene.

Example 11

Preparation and Ethylene/1-Butene Copolymerization of Cyclopentadienyl titanium[tri (t-butyl)phosphinimine)]dichloride and MAO Supported on Triisobutylaluminum-treated Silica Catalyst Preparation The silica supported triisobutylaluminum was prepared in a manner similar to that used for the preparation of the silica supported triethylaluminum described in Example 7, except that the triisobutylaluminum on silica was heated at 150° C. (in vacuo) for three hours.

To a solution of cyclopentadienyl titanium[tri(t-butyl) phosphinimine)]dimethyl in toluene (0.085 mmoL, prepared as described in Example 5) was added a toluene solution of PMAO (0.574 g of a 10 wt. % toluene solution, Akzo Nobel). The solution was allowed to stir for 30 minutes and then added slowly to a toluene suspension of the triisobutylaluminum treated silica (0.934 g in 15 mL). The suspension was allowed to stir for 30 minutes and the toluene removed in vacuo at a temperature of 40° C. Addition of dry hexane gave a suspension which was filtered and, after repeated washing with hexane and subsequent drying in vacuo, gave 0.71 g of a light yellow powder.

Polymerization

Using the same procedure as described in Example 1 except that 52 mg of the supported catalyst was used, 15 g of polyethylene was obtained, representing a catalyst productivity of 33,800 g/g Ti. The polymer, characterized by GPC, showed a molecular weight of 688,000 (Mw) and a polydispersity of 3.5. The polymer was found to contain 2.8 mol % of 1-butene.

Example 12

Preparation and Ethylene/1-Butene Copolymerization of MAO/Silica Supported Cyclopentadienyl titanium [(tri(t-butyl) phosphinimine)]dichloride Using the same catalyst as described in Example 3 in a quantity of 50 mg, and identical polymerization conditions as described in Example 3 with the exception that hydrogen gas was added to give a molar ratio of hydrogen to ethylene of 2.5%, 26 g of polyethylene was obtained, representing a catalyst productivity of 60,000 g/g Ti. The polymer, characterized by GPC, showed a molecular weight of 80,000 (Mw) and a polydispersity of 3.6. The polymer was found to contain 3.1 mol % of 1-butene.

Comparative Example 1

Preparation and Ethylene/1-Butene Copolymerization of MAO/Silica Supported Cyclopentadienyl titanium (2,6-di (isopropyl)phenoxy) dichloride

[Note: The organometallic complex in this comparative example doesn't contain a phosphinimine ligand.]

Catalyst Synthesis

The same procedure as described in Example 1 was used, except that cyclopentadienyl titanium(2,6-di(isopropyl) phenoxy)dichloride (0.051 g, 0.14 mmol) was used in place of cyclopentadienyl titanium[(tri(t-butyl)phosphinimine)](2, 6-di(isopropyl)phenoxy)chloride and that 1.2 g of catalyst was obtained.

Polymerization

Using the same procedure as described in Example 1 except that 50 mg of supported catalyst was used, 0.7 g of polyethylene was obtained, representing a catalyst productivity of 2,000 g PE/g Ti. The polymer, characterized by GPC, showed a molecular weight of 233,000 (Mw) and a polydispersity of 7.7.

Comparative Example 2
Preparation and Ethylene/1-Butene Polymerization of Cyclopentadienyl zirconium trichloride Supported on MAO treated Silica
Catalyst Preparation To 3 g of Witco MAO on $SiO_2$ (product TA-02794, 25 wt. % Al) was added 30 mL of dry toluene and the slurry warmed to 60° C. Separately a solution of $CpZrCl_3$ (146 mg, 0.56 mmol) in 75 mL dry toluene was prepared (note that the $CpZrCl_3$ solution was heated to ca. 50° C. to promote solubilization). The $CpZrCl_3$ solution was then added to the $MAO/SiO_2$ slurry with constant stirring. Following addition, the slurry was allowed to sit at 60° C. for two hours with frequent, but not constant, stirring. After two hours the heat was removed and the slurry was allowed to sit for an additional two hours after which the solvent was decanted and the product dried in vacuo. The resulting dry powder was washed with dry pentane (2×30 mL) and dried in vacuo at room temperature for two hours.
Polymerization Using the same procedure as described in Example 1 except that 60 mg of the supported catalyst was used, 2.5 g of polyethylene was obtained, representing a catalyst productivity of 27,800 g/g Zr. The polymer, characterized by GPC, showed a molecular weight of 136,000 (Mw) and a polydispersity of 4.6. The polymer was found to contain 3.5 mol % of 1-butene.

Comparative Example 3
Preparation and Ethylene Polymerization of Cyclopentadienyl zirconiumtrichloride and MAO Supported on MAO treated Silica
Catalyst Preparation To a 3 g sample of Grace Davison MAO on silica (XPO-2409) was D948 silica (dehydrated at 200° C. for 10 hr) was added 30 mL of dry toluene. In a separate flask, $CpZrCl_3$ (61 mg, 0.23 mmoL) was dissolved in 50 mL dry toluene and to this was added 2.5 mL (5.5 mmoL) of MAO solution (Akzo PMAO/tol-236, 6.7 wt. % Al), and the resultant solution was allowed to stir at room temperature for fifteen minutes. The $MAO/CpZrCl_3$ solution was transferred to the silica slurry and the resultant mixture stirred occasionally over a two hour period at room temperature. The solvent was decanted off and the solids washed repeatedly with dry pentane (4×30 mL) and dried in vacuo at room temperature for two hours to give 2.9 g of a pale yellow solid.
Polymerization Using the same procedure as described in Example 1 except that 67 mg of catalyst was used and ethylene was used in place of ethylene/1-butene, 1.3 g of polyethylene was obtained, representing a catalyst productivity of 3,900 g/g Zr.

Comparative Example 4
Preparation and Ethylene Polymerization of Cyclopentadienyl zirconiumtrimethyl and $[Me_2NHPh][B(C_6F_5)_4]$ Supported on Triethylaluminum-treated Silica A working solution of MeLi (0.14 mmol/mL, 10 mL total volume) was prepared by diluting the stock solution (1.4 M in $Et_2O$) using dry $Et_2O$. $CpZrCl_3$ (26 mg, 0.0926 mmol) was slurried in dry toluene (15 mL), and then treated with MeLi (2 equiv., 0.185 mmol, 1.3 mL of working solution) and allowed to stir for 10 minutes at room temperature. The solvent was removed in vacuo and the solids dried for 60 minutes at room temperature. This product was taken up in dry toluene and to this added a solution of $([Me_2NHPh][B(C_6F_5)_4]$ in toluene (0.20 mmoL, 10 mL) and the resulting solution allowed to stir for 30 minutes. Separately a sample of triethylaluminum supported on silica (1 g, prepared as described in Example 7) was suspended in dry toluene (20 mL) and the $CpZrMe_2Cl/[Me_2NHPh][B(C_6F_5)_4]$ solution was added slowly over 15 minutes. After stirring for 15 minutes, the solvent was removed in vacuo, the solid dried in vacuo for 60 minutes and washed repeatedly with dry hexane. The resulting solid was dried in vacuo overnight, to give a free flowing powder (1.0 g).
Polymerization Using the same procedure as described in Example 1 except that 75 mg of catalyst was used and ethylene was used in place of ethylene/1-butene, 4.6 g of polyethylene was obtained, representing a catalyst productivity of 5,100 g/g Zr.

Comparative Example 5
Preparation and Ethylene/1-Butene Polymerization of Silica Supported bis-Cyclopentadienyl zirconiumdichloride
Catalyst Preparation The same procedure as described in Example 1 was used, except that 2.0 g of the Witco MAO/SiO2 was used, and bis-cyclopentadienyl zirconiumdichloride (0.056 g, 0.20 mmol) was used in place of cyclopentadienyl titanium[(tri(t-butyl)phosphinimine)](2,6-di(isopropyl)phenoxy) chloride and that 1.78 g of a free-flowing powder was obtained. Compositional analysis of the supported catalyst by Neutron Activation showed the catalyst to contain aluminum and zirconium in a ratio of 106:1 (mol basis).
Polymerization Using the same procedure as described in Example 1 except that 58 mg of the supported catalyst was used, 37 g of polyethylene was obtained, representing a catalyst productivity of 81,000 g/g Zr. The polymer, characterized by GPC, showed a molecular weight of 107,000 (Mw) and a polydispersity of 2.9. The polymer was found to contain 1.5 mol % of 1-butene.

Comparative Example 6
Preparation and Ethylene Polymerization of Cyclopentadienyl-titaniumtrichloride Supported on MAO treated Silica
Catalyst Preparation Commercial polymethylaluminoxane (MAO) on granular silica (2.0 g, Witco TA 02794/HL/04, 23 wt. % Al) was suspended in anhydrous toluene (40 mL). A solution of cyclopentadienyl titaniumtrichloride (0.020 g, 0.11 mmol) in anhydrous toluene was prepared and the total volume was added dropwise to a stirred suspension of the MAO on silica. The slurry was allowed to stir overnight and subsequently heated at 45° C. for a period of 2.0 hours. The resulting solid was collected via filtration and washed first with toluene (2×15 mL) and then hexane (2×20 mL). After drying in vacuo, 1.55 grams of a free-flowing solid was obtained. Compositional analysis of the supported catalyst by Neutron Activation showed the catalyst to contain aluminum and titanium in a ratio of 173:1 (mol basis).
Polymerization Using the same procedure as described in Example 1 except that 46 mg of catalyst was used and ethylene was used in place of the ethylene/1-butene. Only trace amounts of polymer were recovered from this experiment, giving a catalyst productivity estimated to be less than 10 g/g Ti.

Polymerization Data For Examples 1–12 And Comparative Examples 1–6

| Example | Metal Complex | Unsupported Activator (if any) | Support | Cat. Productivity (g PE/ g metal) | Cat. Productivity (g PE/g catalyst) | Mw (×10$^{-3}$) | Mw/Mn | 1-C$_4$H$_8$ Content (mol %) |
|---|---|---|---|---|---|---|---|---|
| 1. | CpTi[NP(t-Bu$_3$)][O-(2,6-i-Pr)C$_6$H$_3$]Cl | — | Witco MAO/SiO$_2$ | 125,000 | 1000 | 362 | 3.4 | 3.0 |
| 2. | CpTi[NP(t-Bu$_3$)][O-(2,6-i-Pr)C$_6$H$_3$]Cl | — | Witco MAO/SiO$_2$ | 398,000 | 3200 | 452 | 2.3 | 2.9 |
| 3. | CpTi[NP(t-Bu$_3$)]Cl$_2$ | — | Witco MAO/SiO$_2$ | 113,000 | 1000 | 533 | 4.5 | 2.8 |
| 4. | CpTi[NP(t-Bu$_3$)]Cl$_2$ | — | Witco MAO/SiO$_2$ | 344,000 | 3000 | 512 | 2.3 | 3.2 |
| 5. | CpTi[NP(t-Bu$_3$)]Cl$_2$ | — | Witco MAO/SiO$_2$ | 201,000 | 1500 | 546 | 3.7 | 3.1 |
| 6. | CpTi[NP(t-Bu$_3$)]Cl$_2$ | — | Witco MAO/SiO$_2$ | 107,000 | 1900 | 588 | 4.2 | 2.9 |
| 7. | CpTi[NP(t-Bu$_3$)]Cl$_2$ | — | Modified MAO/SiO$_2$ | 145,000 | 1440 | 472 | 3.3 | 2.9 |
| 8. | CpTi[NP(t-Bu$_3$)]Me$_2$ | — | Witco MAO/SiO$_2$ | 178,000 | 1620 | 557 | 3.1 | 3.9 |
| 9. | CpTi[NP(t-Bu$_3$)]Me$_2$ | — | Modified MAO/SiO$_2$ | 209,000 | 1900 | 622 | 2.3 | 2.5 |
| 10. | CpTi[NP(t-Bu$_3$)]Me$_2$ | [Ph$_3$C][B(C$_6$F$_5$)$_4$] | TEAL/SiO$_2$ | 68,000 | 510 | 519 | 3.5 | 1.8 |
| 11. | CpTi[NP(t-Bu$_3$)]Cl$_2$ | MAO | TIBAI/SiO$_2$ | 33,800 | 300 | 688 | 3.5 | 2.8 |
| 12. | CpTi[NP(t-Bu$_3$)]Cl$_2$ | — | Witco MAO/SiO$_2$ | 60,000 | 500 | 80 | 3.6 | 3.1 |
| Comp. Ex. 1 | CpTi[O-(2,6-i-Pr)C$_6$H$_3$]$_2$Cl | — | Witco MAO/SiO$_2$ | 2,000 | 14 | 233 | 7.7 | a |
| Comp. Ex. 2 | CpZrCl$_3$ | — | Witco MAO/SiO$_2$ | 27,800 | 101 | 136 | 4.6 | 3.5 |
| Comp. Ex. 3 | CpZrCl$_3$ | MAO | Davison MAO/SiO$_2$ | 3,900 | 20 | a | a | N/A |
| Comp. Ex. 4 | CpZrCl$_3$ | [Me$_2$NHPh][B(C$_6$F$_5$)$_4$] | TEAI/SiO$_2$ | 5,100 | 60 | a | a | N/A |
| Comp. Ex. 5 | Cp$_2$ZrCl$_2$ | — | Witco MAO/SiO$_2$ | 81,000 | 600 | 107 | 2.9 | 1.5 |
| Comp. Ex. 6 | CpTiCl$_3$ | — | Witco MAO/SiO$_2$ | <10 | ca. 0 | N/A | N/A | N/A | a. data not measured

Catalyst Preparation and Polymerization Testing Using a Semi-Batch, Slurry Phase Reactor All the polymerization experiments described below were conducted using a semi-batch, slurry phase polymerization reactor of total internal volume of 2.2 L. Ethylene, at a fixed reactor pressure of 200 psig, was measured to the reactor on a continuous basis using a calibrated thermal mass flow meter, following passage through purification media as described above. A pre-determined mass of the catalyst sample, as a slurry in purified Nujol, was added to the reactor under the flow of the inlet gas with no pre-contact of the catalyst with any reagent, such as a catalyst activator. The polymerization solvent was n-hexane (600 mL) which was also purified in the manner previously described. Copolymerization experiments utilized 1-hexene as the comonomer at an initial concentration of 0.41 mol/L in the liquid phase. Similar purification methods were used for the 1-hexene. The catalyst was activated in-situ (in the polymerization reactor) at the reaction temperature in the presence of the monomers, using a metal alkyl compound (triisobutylaluminum) which had been previously added to the reactor to remove adventitious impurities.

The internal reactor temperature is monitored by a thermocouple in the polymerization medium and can be controlled at the required set point to +/−2.0° C. The duration of the polymerization experiment was one hour. Following the completion of the polymerization experiment, the polymerization solvent was allowed to evaporate and the polymer dried under ambient conditions after which the yield was determined.

Example 14

Preparation and Ethylene/1-Hexene Copolymerization of MAO/Silica Supported Cyclopentadienyl titanium[(tri(t-butyl) phosphinimine)](2,6-di(isopropyl)phenoxy) chloride The polymerization experiment was conducted by using 3 mg of the same catalyst used in Example 1. On isolation and drying the polymer, a yield of 25 g was obtained, representing a catalyst productivity of 1,200,000 g PE/g Ti. The polymer, characterized by GPC, showed a molecular weight of 887,000 (Mw) and a polydispersity of 2.1. The polymer was found to contain 1.5 mol % of 1-hexene.

Example 15

Preparation and Ethylene/1-Hexene Copolymerization of MAO/Silica Supported Cyclopentadienyl titanium[(tri(t-butyl) phosphinimine)]dichloride The polymerization experiment was conducted by using 3 mg of the same catalyst used in Example 2. On isolation and drying the polymer, a yield of 21 g was obtained, representing a catalyst productivity of 970,000 g PE/g Ti. The polymer, characterized by GPC, showed a molecular weight of 994,000 (Mw) and a polydispersity of 2.1. The polymer was found to contain 1.6 mol % of 1-hexene.

Example 16

Preparation and Ethylene/1-Hexene Copolymerization of Cyclopentadienyl titanium[tri(t-butyl)phosphinimine)]dimethyl and [Ph$_3$C][B(C$_6$F$_5$)$_4$] Supported on Triethylaluminum-treated Silica The polymerization experiment was conducted by using 8 mg of the same catalyst used in Example 7. On isolation and drying the polymer, a yield of 27 g was obtained, representing a catalyst productivity of 500,000 g PE/g Ti. The polymer, characterized by GPC, showed a molecular weight of 700,000 (Mw) and a polydispersity of 2.1. The polymer was found to contain 1.2 mol % of 1-hexene.

12(3) said catalyst component is prepared by mixing said volume of catalyst/activator solution from 12(1) and said particulate support from 12(2) until said volume of catalyst/activator solution is substantially contained within said pore volume.

Polymerization Data For Examples 13–15

| Example | Metal Complex | Activator | Support | Cat. Productivity (g PE/ g metal) | Cat. Productivity (g PE/ g catalyst) | Mw ($\times 10^{-3}$) | Mw/Mn | 1-$C_6H_{12}$ Content (mol %) |
|---|---|---|---|---|---|---|---|---|
| 14 | CpTi[NP(t-$Bu_3$)][O-(2,6-i-Pr)$C_6H_3$]Cl | — | Witco MAO/$SiO_2$ | 1,200,000 | 10,000 | 887 | 2.1 | 1.5 |
| 15 | CpTi[NP(t-$Bu_3$)]$Cl_2$ | — | Witco MAO/$SiO_2$ | 970,000 | 8,500 | 994 | 2.1 | 1.6 |
| 16 | CpTi[NP(t-$Bu_3$)]$Me_2$ | [$Ph_3C$][B($C_6F_5$)4] | TEAl/$SiO_2$ | 500,000 | 3,700 | 700 | 2.1 | 1.2 |

What is claimed is:

1. A catalyst component for olefin polymerization comprising:
   (a) an organometallic complex comprising
      A) one, and only one, metal atom of a group 4 metal selected from Ti, Hf, and Zr;
      B) a cyclopentadienyl-type ligand;
      C) a phosphinimine ligand; and
      D) two univalent ligands; and
   (b) a particulate support.

2. The catalyst component according to claim 1 wherein said particulate support is selected from metal oxide, metal chloride, talc and polymer.

3. The catalyst component according to claim 2 wherein said particulate support is a metal oxide selected from silica and silica-alumina.

4. The catalyst component according to claim 1 which contains a supported activator.

5. The catalyst component according to claim 4 wherein said activator is selected from an alumoxane and a substantially non-coordinating anion.

6. The catalyst component according to claim 5 wherein said activator is a substantially non-coordinating anion described by the formula:

$$[B(R^7)_4]^-$$

wherein each $R^7$ is a fluorinated phenyl ligand and B is boron.

7. The catalyst component according to claim 4 wherein said supported activator is an alumoxane.

8. The catalyst component according to claim 7 with the further proviso that the molar ratio of Al/M is from 100:1 to 200:1 wherein Al is aluminum contained in said alumoxane and M is said transition metal.

9. The catalyst component according to claim 8 wherein:
   (a) said alumoxane is initially deposited on said support;
   (b) said organometallic complex is subsequently deposited; and
   (c) said Al/M molar ratio is from 110:1 to 150:1.

10. The catalyst component according to claim 1 which is prepared by co-spraying/drying said organometallic complex and said particulate support.

11. The catalyst component according to claim 4 wherein:
   12(1) said organometallic complex and said activator are initially provided in the form of a volume of catalyst/activator solution;
   12(2) said particulate support has a pore volume which is greater than said volume of catalyst/activator solution;

12. A process for olefin polymerization comprising polymerizing ethylene, optionally with at least one addition alpha olefin, in the presence of a catalyst component according to claim 1.

13. The process according to claim 12 when conducted in a gas phase reactor.

14. The process according to claim 12 when conducted in a slurry reactor.

15. The process according to claim 13 wherein a trialkyl aluminum is added as a poison scavenger.

16. The process according to claim 15 when conducted at a temperature of from 75 to 115° C. and a pressure of from 100 to 350 pounds per square inch.

17. The process according to claim 16 when conducted in a condensing mode in the presence of an alkane or isoalkane which is condensable at the polymerization pressure by contact with a chilling coil.

18. The catalyst component according to claim 1 wherein said phosphinimine ligand is tri(tertiary butyl) phosphinimine.

19. The catalyst component according to claim 9 which contains a coating of mineral oil, wherein said mineral oil is coated subsequent to the deposition of said organometallic complex.

20. The catalyst component according to claim 1 wherein said organometallic complex comprises a complex of the formula:

$$[(R^1)_3\text{---}P\!\!=\!\!N]_n\text{---}\underset{\underset{\displaystyle Cp}{|}}{M}\text{---}(L^1)_{3-n}$$

wherein
   A) M is selected from the group consisting of Ti, Zr, and Hf; n is 1 or 2;
   B) Cp is a cyclopentadienyl-type ligand which is unsubstituted or substituted by up to five substituents independently selected from the group consisting of $C_{1-10}$ hydrocarbyl radicals with the proviso that two hydrocarbyl radicals taken together may form a ring, wherein said substituents or ring are unsubstituted or further substituted by substituents selected from the group consisting of:
      a) a halogen atom,
      b) a $C_{1-8}$ alkyl radical,
      c) a $C_{1-8}$ alkoxy radical,
      d) a $C_{6-10}$ aryl or aryloxy radical,
      e) an amido radical which is unsubstituted or substituted by up to two $C_{1-8}$ alkyl radicals, f) a phosphido radical which is unsubstituted or substituted by up to two $C_{1-8}$ alkyl radicals, g) a silyl radical of the formula —Si—$(R^2)_3$ wherein each $R^2$ is independently selected from the group consisting of hydrogen, a $C_{1-8}$ alkyl or alkoxy radical, $C_{6-10}$ aryl or aryloxy radicals, h) a germanyl radical of the formula Ge—$(R^{21})_3$ wherein each $R^{21}$ is independently selected from the group consisting of hydrogen, a $C_{1-8}$ alkyl or alkoxy radical, $C_{6-10}$ aryl or aryloxy radicals;

C) each $R^1$ is independently selected from the group consisting of:

i) a hydrogen atom, j) a halogen atom, k) $C_{1-10}$ hydrocarbyl radicals which are unsubstituted by or further substituted by a halogen atom, a $C_{1-8}$ alkyl radical, $C_{1-8}$ alkoxy radical, a $C_{6-10}$ aryl or aryloxy radical, l) a silyl radical of the formula —Si—$(R^{22})_3$ wherein each $R^{22}$ is independently selected from the group consisting of hydrogen, a $C_{1-8}$ alkyl or alkoxy radical, $C_{6-10}$ aryl or aryloxy radicals, m) a germanyl radical of the formula Ge—$(R^{23})_3$ wherein each $R^{23}$ is independently selected from the group consisting of hydrogen, a $C_{1-8}$ alkyl or alkoxy radical, $C_{6-10}$ aryl or aryloxy radicals, with the proviso that two $R^1$ radicals taken together may form a bidentate hydrocarbyl radical having up to 10 carbon atoms, wherein said bidentate hydrocarbyl radical is unsubstituted by or further substituted by substituents selected from the group consisting of:

n) a halogen atom, o) a $C_{1-8}$ alkyl radical, p) a $C_{1-8}$ alkoxy radical, q) a $C_{6-10}$ aryl or aryloxy radical, r) a silyl radical of the formula —Si—$(R^{24})_3$ wherein each $R^{24}$ is independently selected from the group consisting of hydrogen, a $C_{1-8}$ alkyl or alkoxy radical, $C_{6-10}$ aryl or aryloxy radicals, s) a germanyl radical of the formula Ge—$(R^{25})_3$ wherein each $R^{25}$ is independently selected from the group consisting of hydrogen, a $C_{1-8}$ alkyl or alkoxy radical, $C_{6-10}$ aryl or aryloxy radicals;

provided that $R^1$ individually or two $R^1$ radicals taken together may not form a Cp ligand as defined above; and D) each $L^1$ is independently selected from the group consisting of:

t) a hydrogen atom, u) a halogen atom, v) a $C_{1-10}$ hydrocarbyl radical, w) a $C_{1-10}$ alkoxy radical, x) a $C_{6-10}$ aryl oxide radical, each of which said hydrocarbyl, alkoxy, and aryl oxide radicals may be unsubstituted by or further substituted by substituents selected from the group consisting of:

y) a halogen atom, z) a $C_{1-8}$ alkyl radical, aa) a $C_{1-8}$ alkoxy radical, bb) a $C_{6-10}$ aryl or aryloxy radical, cc) an amido radical which is unsubstituted or substituted by up to two $C_{1-8}$ alkyl radicals, dd) a phosphido radical which is unsubstituted or substituted by up to two $C_{1-8}$ alkyl radicals, with the proviso that $L^1$ may not be a Cp radical as defined above.

* * * * *